United States Patent [19]
Sakaguchi

[11] Patent Number: 5,734,579
[45] Date of Patent: Mar. 31, 1998

[54] ROTATIONAL-DEVICE METHOD AND SYSTEM

[75] Inventor: Yoshitami Sakaguchi, Yokohama, Japan

[73] Assignee: International Business Machines Corporation, Armonk, N.Y.

[21] Appl. No.: 516,839

[22] Filed: Aug. 18, 1995

[30] Foreign Application Priority Data

Sep. 7, 1994 [JP] Japan .................. 6-214054

[51] Int. Cl.⁶ .................................. G08B 21/00
[52] U.S. Cl. .................. 364/487; 364/508; 395/183.18; 324/76.12; 324/76.13; 324/76.14; 73/659; 73/660; 73/602
[58] Field of Search .................. 364/487, 508; 395/183.18; 73/659, 660, 602; 360/97.01, 78.06; 324/76.12, 76.13, 76.19

[56] References Cited

U.S. PATENT DOCUMENTS

| | | | |
|---|---|---|---|
| 4,408,294 | 10/1983 | Imam | 364/508 |
| 4,419,897 | 12/1983 | Matsuoka | 73/660 |
| 4,425,798 | 1/1984 | Nagai et al. | 73/659 |
| 4,471,444 | 9/1984 | Yee et al. | 364/475 |
| 4,669,315 | 6/1987 | Sato et al. | 73/660 |
| 4,751,657 | 6/1988 | Imam et al. | 364/508 |
| 4,843,885 | 7/1989 | Bambara | 73/660 |
| 4,988,979 | 1/1991 | Sasaki et al. | 73/660 |
| 5,029,477 | 7/1991 | Bambara | 73/660 |
| 5,475,545 | 12/1995 | Hampshire et al. | 360/78.06 |
| 5,510,954 | 4/1996 | Wyler | 360/97.01 |

*Primary Examiner*—Emanuel T. Voeltz
*Assistant Examiner*—Hien Vo
*Attorney, Agent, or Firm*—Brian F. Russell; Andrew J. Dillon

[57] ABSTRACT

A rotational-device test system and method is provided to classify a rotational device according to the type of drive sound thereof. A divider divides the time-series data of an amplitude of the drive sound of an HDD digitized in a converter at intervals of a predetermined time and generates a time-series data group for each frame. An analyzer converts each data item of the time-series data group to a power spectrum. A cycle arithmetic unit selects a maximum point whose self-correlation between a leading frame and each of frames other than the leading frame is maximum, as a candidate point for one cycle of the drive sound, and detects a point whose self-correlation is maximum and which has as a starting point the leading time-series data in the leading frame and the candidate point, and, based on the frame of the candidate point in the detected point whose self-correlation is maximum and on the leading frame, specifies the cycle of the drive sound. A comparator compares a sample having a cycle substantially identical to the cycle of the drive sound of the HDD stored in a storage device and the power spectrum of one cycle by a mutual correlation, and a decision device classifies the HDD based on the result of the comparison.

18 Claims, 12 Drawing Sheets

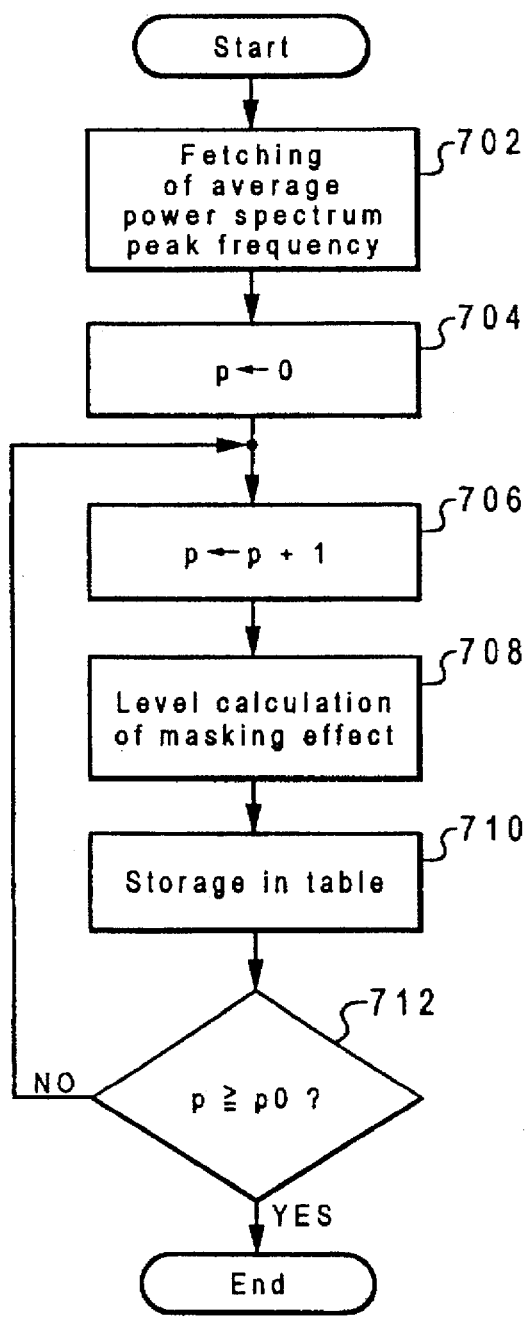
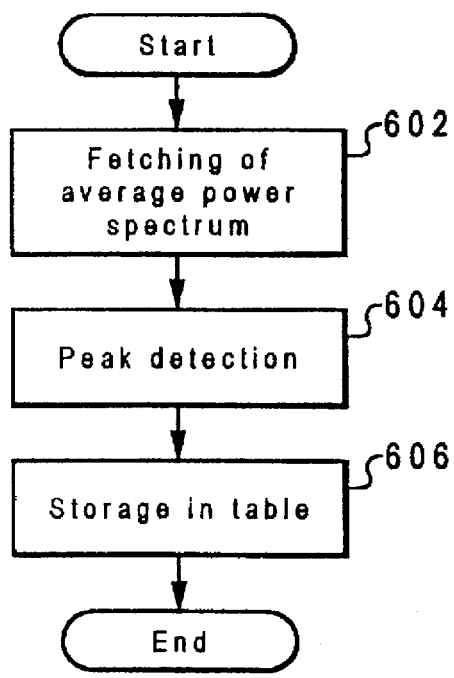
Fig. 11
Fig. 12

ROTATIONAL-DEVICE METHOD AND SYSTEM

BACKGROUND OF THE INVENTION

1. Technical Field

The present invention relates in general to a rotational-device test system and a rotational-device test method and, more particularly, to a rotational-device test system and a rotational-device test method which classify and test a rotational device based on the power spectrum, which is obtained by converting through frequency conversion the time-series data on one frame which is obtained by dividing the digitized time-series data of the amplitude of the drive sound of the rotational device to a plurality of frames each having a predetermined time span, and to a rotational-device test system and a rotational-device test method which detect whether a predetermined dull sound exits in the drive sound of the rotational device or not, based on that power spectrum.

2. Description of the Related Art

In a rotational-device test system such as a hard disk drive of the prior art, hard disk drives are classified into products having good quality and products having bad quality by detecting only the level of the drive sound produced when the hard disk drive is driven and detecting whether the detected drive sound level is greater than a certain threshold value or not. However, with recent advancements in the development of hard disk drives and a reduction in the drive sound, there has become conspicuous a dull sound, humming, buzzing, and the like which had hitherto been covered by the drive sound. Thus, if the drive sound level is reduced, and the dull sound, humming, buzzing, and the like in the drive sound become conspicuous, these sounds will be offensive to the ear and make users feel uncomfortable.

Therefore, to classify a hard disk drive into products having good quality and products having bad quality by whether the dull sound, humming, and the like make users feel uncomfortable or not, it is necessary to classify the hard disk drive according to the type of drive sound of the hard disk. However, since the above-described test system for a hard disk drive detects only the drive sound level, it cannot classify the hard disk drive according to the type of drive sound.

Incidentally, to classify the hard disk drive, for example, by whether a dull sound that makes users feel uncomfortable exists in the drive sound or not, the spectrum of the drive sound of the hard disk drive is obtained with an expensive frequency analyzer, the frequency at which the drive sound exists is examined from the spectrum by an operator, and it must be determined whether the frequency component becomes a drive sound that makes users feel uncomfortable or not. It therefore takes substantial labor and time, and hard disk drives which are produced on a large scale cannot be classified in a short period of time.

The present invention is made in view of the above-described facts, and an object of the invention is to provide a rotational-device test system and a rotational-device test method which are capable of classifying a rotational device according to the type of the drive sound of the rotational device, and a rotational-device test system and a rotational-device test method which are capable of detecting in a short period of time whether a predetermined dull sound exists in the drive sound of a rotational device that is produced on a large scale.

SUMMARY OF THE INVENTION

According to the present invention, a rotational-device test method and system is provided comprising a detection means for detecting time-series data on the amplitude of a drive sound of a rotational device; a digital conversion means for converting the detected time-series data to digital data; a power spectrum conversion means for converting a plurality of frame time-series data, obtained by dividing the converted digital time-series data into a plurality of frames at intervals of a predetermined time, to a plurality of power spectra through frequency conversion; a cycle specification means for determining a candidate point, which becomes the candidate for the starting point of a cycle of the drive sound, for each of said frames, and for specifying said cycle of the drive sound by specifying said starting point of the cycle from the candidate points of said plurality of frames; and a rotational-device classification means for classifying said rotational device based on the power spectrum of one cycle of the drive sound of said rotational device which is based on the specified cycle and the converted power spectrum.

The present invention further comprises a method of detecting time-series data of an amplitude of a drive sound; converting the detected time-series data to digital data; dividing said digital data into a plurality of frames at intervals of a predetermined time and converting a plurality of the divided frame time-series data to a plurality of power spectra through frequency conversion; and testing a rotational device by classifying said drive sound by comparing the converted power spectrum with the data of the drive sound stored in advance in the form of a power spectrum. A cycle of said drive sound is specified, and only the data on the drive sound stored in advance which has a frequency substantially identical to the specified cycle of said drive sound is an object of said comparison.

In the invention as set forth in claim 1, the detection means detects time-series data of an amplitude of a drive sound of a rotational device, and the digital conversion means converts the detected time-series data to digital data. The power spectrum conversion means converts a plurality of frame time-series data, obtained by dividing the converted digital time-series data into a plurality of frames at intervals of a predetermined time, to a plurality of power spectra through frequency conversion.

The cycle specification means determines a candidate point, which becomes the candidate for a starting point of a cycle of the drive sound, for each of said frames, and specifies said cycle of the drive sound by specifying said starting point of a cycle from the candidate points of said plurality of frames.

The cycle of the drive sound of the rotational device can be specified as follows: For example, as with the invention as set forth in claim 2, said candidate point can be specified by a self-correlation. Also, as with the invention as set forth in claim 3, said starting point of a cycle can be specified by a self-correlation.

Further, as with the invention as set forth in claim 4, by selecting a maximum point whose self-correlation between the leading frame of said plurality of frames and each of other frames other than said leading frame is maximum, as the candidate point for determining said one cycle of the drive sound and, by detecting a point whose self-correlation is maximum, the self-correlation having as a starting point the leading time-series data in said leading frame and said candidate point, and based on the frame of said candidate point in the detected point whose self-correlation is maximum and on said leading frame, said cycle of said drive sound can be specified. As with the invention as set forth in claim 5, said maximum point may be obtained by obtaining a self-correlation point, which has as the starting point said leading time-series data in said leading frame and leading time-series data in a frame other than said leading frame, for every combination of said leading frame and each of the frames other than said leading frame, and by detecting a point whose self-correlation point obtained is maximum, for every said combination.

If, as with the above-described inventions as set forth in claims 2 through 5, the cycle of the drive sound of the rotational device is specified by determining a candidate point which becomes the candidate for the starting point of the cycle of the drive sound, for each frame, and by specifying the starting point of the cycle of the drive sound from a plurality of candidate points, an amount of calculation for calculating the cycle of the drive sound can be reduced and processing speed can be enhanced.

Further, the rotational-device classification means classifies said rotational device based on the power spectrum of one cycle of the drive sound of said rotational device. The power spectrum is based on the cycle specified by the cycle specification means and on the power spectrum converted by the power spectrum conversion means.

As described above, the invention as set forth in claim 1 can classify a rotational device according to the type of the drive sound thereof, since the rotational device can be specified according to the type of drive sound because the frequency of the drive sound is distinctive according to the types of products having good quality and products having bad quality and defects, the power spectrum is obtained by converting the digital time-series data of the amplitude of the drive sound through frequency conversion, and the rotational device is classified based not on the level of the drive sound but on the power spectrum.

In the invention as set forth in claim 6, a sample of the power spectrum of one cycle of the drive sound of each of the rotational devices has been stored in advance in the sample storage means, which is further comprised in the invention as set forth in any one of claims 1 through 5, according to the types of rotational devices.

Further, the rotational-device classification means classifies said rotational device by selecting samples having a cycle substantially equal to said cycle of the drive sound of the rotational device from the samples stored in said sample storage means and by detecting a sample whose mutual correlation between each of said samples and said drive sound spectrum of one cycle of the rotational device is maximum.

Since samples having a cycle substantially identical with the cycle of the drive sound of the rotational device are thus selected, unnecessary samples can be excluded. Since the rotational device is classified by detecting a sample whose mutual correlation between each of the samples and the drive sound spectrum of the rotational device is maximum, processing time can be shortened and, further, the rotational device can be classified according to the type of the drive sound thereof with a smaller amount of data.

In the invention as set forth in claim 7, the detection means detects time-series data of an amplitude of a drive sound of a rotational device, and the digital conversion means converts the time-series data detected by the detection means to digital data.

The power spectrum conversion means converts a plurality of frame time-series data obtained, by dividing the digital time-series data converted by the digital conversion means into a plurality of frames at intervals of a predetermined time, to a plurality of power spectra through frequency conversion.

The power detection means detects the tone power which is the power of the drive sound contained in a narrow band region. The narrow band region is based on a frequency corresponding to a peak point of the power spectrum converted by the power spectrum conversion means and has said frequency corresponding to the peak point at its center. The power detection means also detects noise power which is the power of the drive sound in a critical band region width having the peak frequency at its center. The dull-sound detection means detects whether a predetermined dull sound exists in said drive sound of the rotational device or not, based on the tone power and noise power detected by the power detection means.

Thus, since the dull sound is classified according to the tone power and noise power thereof and a predetermined dull sound can be specified, it is detected whether a predetermined dull sound exists in said drive sound of the rotational device or not, based on the tone power and noise power. Accordingly, whether a predetermined dull sound exists in the rotational devices which are produced on a large scale can be detected for a short period of time, without spending substantial labor.

The invention as set forth in claim 8, by detecting time-series data of an amplitude of a drive sound, converting the detected time-series data to digital data, dividing said digital data into a plurality of frames at intervals of a predetermined time and converting a plurality of the divided frame time-series data to a plurality of power spectra through frequency conversion, and by comparing the converted power spectrum with data of the drive sound stored in advance in the form of a power spectrum, specifies said cycle of the drive sound, when the rotational device is tested by classifying said drive sound.

The cycle of the drive sound of the rotational device can be specified as follows: For example, as with the invention as set forth in claim 9, said cycle of said drive sound is specified by a first step of determining a candidate point which becomes a candidate for a starting point of said cycle of said drive sound, for each frame, and a second step of specifying said starting point of said cycle from a plurality of determined candidate points. Also, as with the invention as set forth in claim 10, said cycle of said drive sound is specified by a self-correlation. Further, as with the invention as set forth in claim 11, by selecting a maximum point whose self-correlation between the leading frame of said plurality of frames and each of the other frames other than said leading frame is maximum, as a candidate point for determining said one cycle of the drive sound, and by detecting a point whose self-correlation is maximum, the self-correlation having as a starting point the leading time-series data in said leading frame and said candidate point, and based on the frame of said candidate point in the detected point whose self-correlation is maximum and on said leading frame, said cycle of said drive sound is specified. The maximum point, as with the invention as set forth in claim 12, is obtained by obtaining a self-correlation having said leading time-series data in said leading frame and leading time-series data in a frame other than said leading frame, as a starting point, for every combination of said leading frame and each of the frames other than said leading frame, and by detecting a point whose self-correlation point obtained is maximum, for every said combination.

If, as with the above-described inventions as set forth in claims 9 through 12, the cycle of the drive sound of the rotational device is specified by determining a candidate point which becomes a candidate for the starting point of the cycle of the drive sound, for each frame, and by specifying the starting point of the cycle of the drive sound from a plurality of candidate points, the amount of calculation for calculating the cycle of the drive sound can be reduced and processing speed can be enhanced.

Further, the drive sound is classified and the rotational device is tested, by comparing only the previously stored data of the drive sound having a cycle substantially identical with said specified cycle with said converted power spectrum.

Since, as described above, the invention as set forth in claim 8 classifies the drive sound and tests the rotational device by comparing only the previously stored data of the drive sound having a cycle substantially identical to said specified cycle with said converted power spectrum, the rotational device can be classified according to the type of the drive sound thereof with a smaller amount of data.

The invention as set forth in claim 13 detects time-series data of an amplitude of a drive sound of a rotational device, converts the detected time-series data to digital data, divides said digital data into frames having a specified length of time and converts a plurality of the frame time-series data to a plurality of power spectra through frequency conversion, and detects whether a predetermined dull sound exists in the drive sound of the rotational device or not, based on the converted power spectra.

Whether a predetermined dull sound exists in the drive sound of the rotational device or not, can be detected as follows: For example, as with the invention as set forth in claim 14, tone power which is the power of the drive sound contained in a narrow band region, which region is based on a frequency corresponding to the peak point of the converted power spectrum and has said frequency corresponding to the peak point at its center, is detected, noise power which is the power of the drive sound in a critical band region width having the peak frequency at its center is detected, and whether a predetermined dull sound exists in said drive sound of the rotational device is detected based on the detected tone power and noise power. When whether a predetermined dull sound exists in said drive sound of the rotational device is thus detected based on the tone power and the noise power, substantial labor and time become can be saved, and whether a predetermined dull sound exists in rotational devices that are produced on a large scale can be detected in a short period of time.

The above-described peak point, as with the invention as set forth in claim 15, can be obtained by obtaining a function of more than the second order of the frequency of the drive sound and the energy of the drive sound of said frequency, based on said converted power spectrum, and by obtaining a differential coefficient of the obtained function. If the peak point is thus obtained by obtaining a function of more than the second order of the frequency of the drive sound and energy of the drive sound of said frequency, based on said converted power spectrum, and by obtaining a differential coefficient of the function of more than the second order, the peak point for detecting the tone power can be obtained in a short period of time.

Also, as with the invention as set forth in claim 16, an average power spectrum is calculated by averaging said converted plurality of power spectra of said frames for every frequency, said tone power and said noise power are detected based on the frequency corresponding to the peak point of the obtained average power spectrum, and whether a predetermined dull sound exists in said drive sound of the rotational device is detected based on the detected tone power and noise power. Thus, if an average power spectrum is calculated by averaging said converted plurality of power spectra of said frames for every frequency, said tone power and said noise power are detected based on the frequency corresponding to the peak point of the obtained average power spectrum, and whether a predetermined dull sound exists in said drive sound of the rotational device is detected based on the detected tone power and noise power, whether a predetermined dull sound exists in rotational devices that are produced on a large scale can be detected accurately in a short period of time, without wasting substantial labor and time The above-described peak point, as with the invention as set forth in claim 17, is obtained by obtaining a function of more than the second order of a frequency of the drive sound and energy of the drive sound of said frequency, based on said average power spectrum, and by obtaining a differential coefficient of the obtained function. If the peak point is thus obtained by obtaining a function of more than the second order of the frequency of the drive sound and energy of the drive sound of said frequency, based on said average power spectrum, and by obtaining a differential coefficient of the function of more than the second order, the peak point for detecting the tone power can be obtained accurately in a short period of time.

As described above, the invention as set forth in claim 13 detects whether a predetermined dull sound exists in the drive sound of the rotational device, based on the converted power spectrum. Therefore, whether a predetermined dull sound exists in rotational devices that are produced on a large scale can be detected in a short period of time.

In the invention as set forth in claim 18, time-series data of a drive sound of a rotational body is detected, a cycle of said drive sound from said time-series data is specified, and a rotational device is tested by classifying the rotational device by comparing the time-series data of the specified one cycle with the previously stored data of the drive sound having a cycle substantially identical to said specified cycle.

Thus, since the cycle of said drive sound from said time-series data of a drive sound of a rotational body is specified and the rotational device is classified by comparing the time-series data of the specified one cycle with the previously stored data of the drive sound having a cycle substantially identical to said specified cycle, the rotational device can be classified with a smaller amount of data.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11 is a flowchart showing the peak frequency detection processing routine;

FIG. 12 is a flowchart showing the computation processing routine for computing the level of a masking effect;

DETAILED DESCRIPTION OF THE PREFERRED EMBODIMENT

Figure 1:
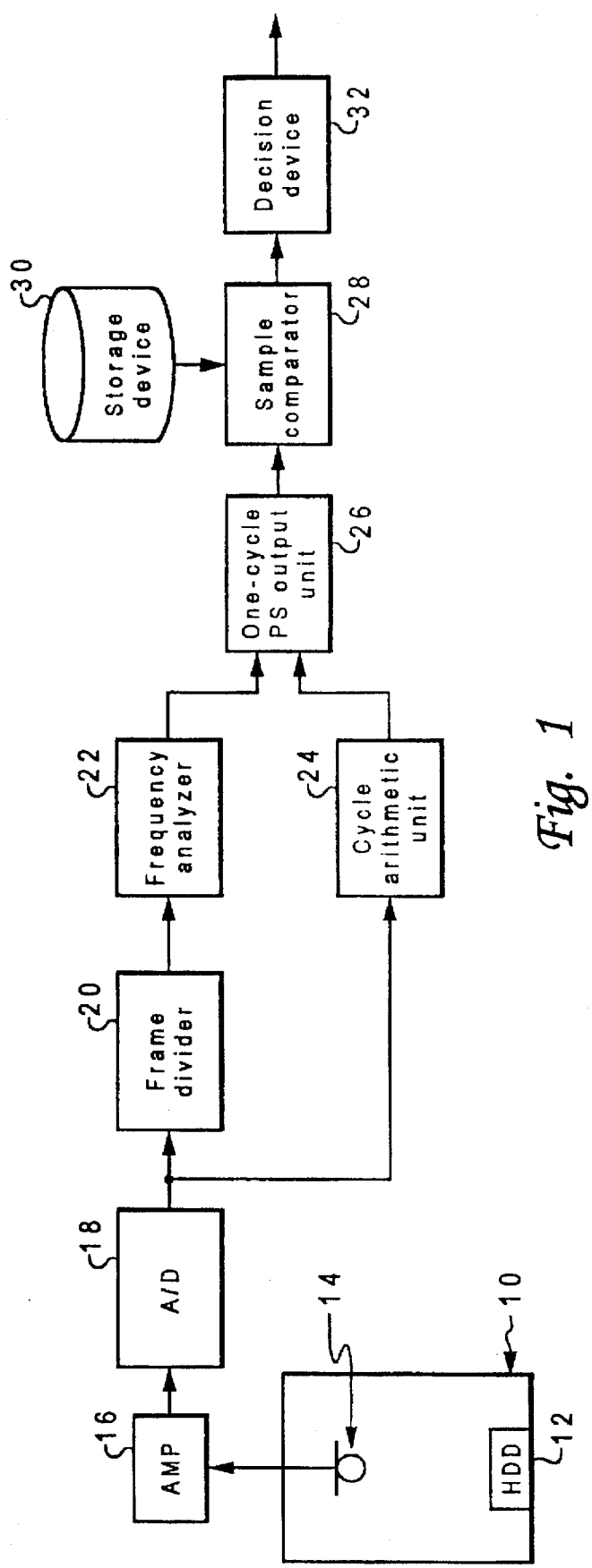
FIG. 1 is a block diagram showing a first embodiment of the present invention.

A first embodiment of the present invention will hereinafter be described in detail with reference to the drawings. In a rotational-device test system of this embodiment, a rotational device such as a hard disk drive is classified based on the tone of the drive sound of the hard disk drive. This rotational-device test system is provided with a soundproof box 10 for excluding outside sounds, as shown in FIG. 1. Within the soundproof box 10 there are provided a hard disk drive 12 (hereinafter referred to as an HDD) to be classified and a microphone 14 for detecting the time-series data (analog value) of the amplitude of a drive sound produced when the HDD 12 is driven. The microphone 14 is connected to an amplifier (AMP) 16, which is connected to an analog/digital (A/D) converter 18.

The A/D converter 18 is provided with an A/D converter section (not shown) and a memory section (not shown). The memory section is constituted of a ring buffer. In the A/D converter section, the drive sound of the HDD 12 is detected, for example, in a range from 0 Hz to 5 kHz, the time-series data of the amplitude of the drive sound of the HDD 12 is sampled at a predetermined sampling cycle, and the sampled time-series data analog value is digitized. The digitized data is stored in the ring buffer. Thus, the memory section is constituted of the ring buffer. Therefore, for example, when data (2 bytes for one data item) for two seconds is handled at a sampling cycle of 10 kHz, they can be processed with a significantly reduced amount of memory even if a memory capacity of 40,000 bytes would be needed if the ring buffer were not used. The detection of the drive sound of the HDD 12 in the range from 0 Hz to 5 kHz by the A/D converter 18 is merely one instance of detection, and the drive sound of the HDD 12 in other ranges may also be detected.

The A/D converter 18 is connected to a frame divider 20 and a cycle arithmetic unit 24. The frame divider 20 is connected to a frequency analyzer 22. The frame divider 20 is provided with a frame generation section (not shown) and a memory section (not shown). The memory section is constituted of a double buffer.

In the frame generation section, a plurality of flames (in this embodiment, 40 frames) is generated by dividing waveform data at t0 (in this embodiment, 25.6 mS). The generated frames are stored in the double buffer. The cycle arithmetic unit 24 is constituted of a digital signal processor (DSP).

The frequency analyzer 22 and the cycle arithmetic unit 24 are connected to a one-cycle power spectrum output unit 26. The one-cycle power spectrum output unit 26 is connected to a sample comparator 28 which performs template matching. The sample comparator 28 is connected to a storage device 30 and a decision device 32.

The operation of the present invention will be described next. The HDD 12 is driven within the soundproof box 10 by which outside sounds are excluded, and the microphone 14 detects the time-series data (hereinafter referred to as analog waveform data) of the amplitude of a drive sound produced by the HDD 12 and outputs it to the amplifier 16. The amplifier 16 amplifies the input analog waveform data of the drive sound and outputs the amplified data to the A/D converter 18.

Figure 2:
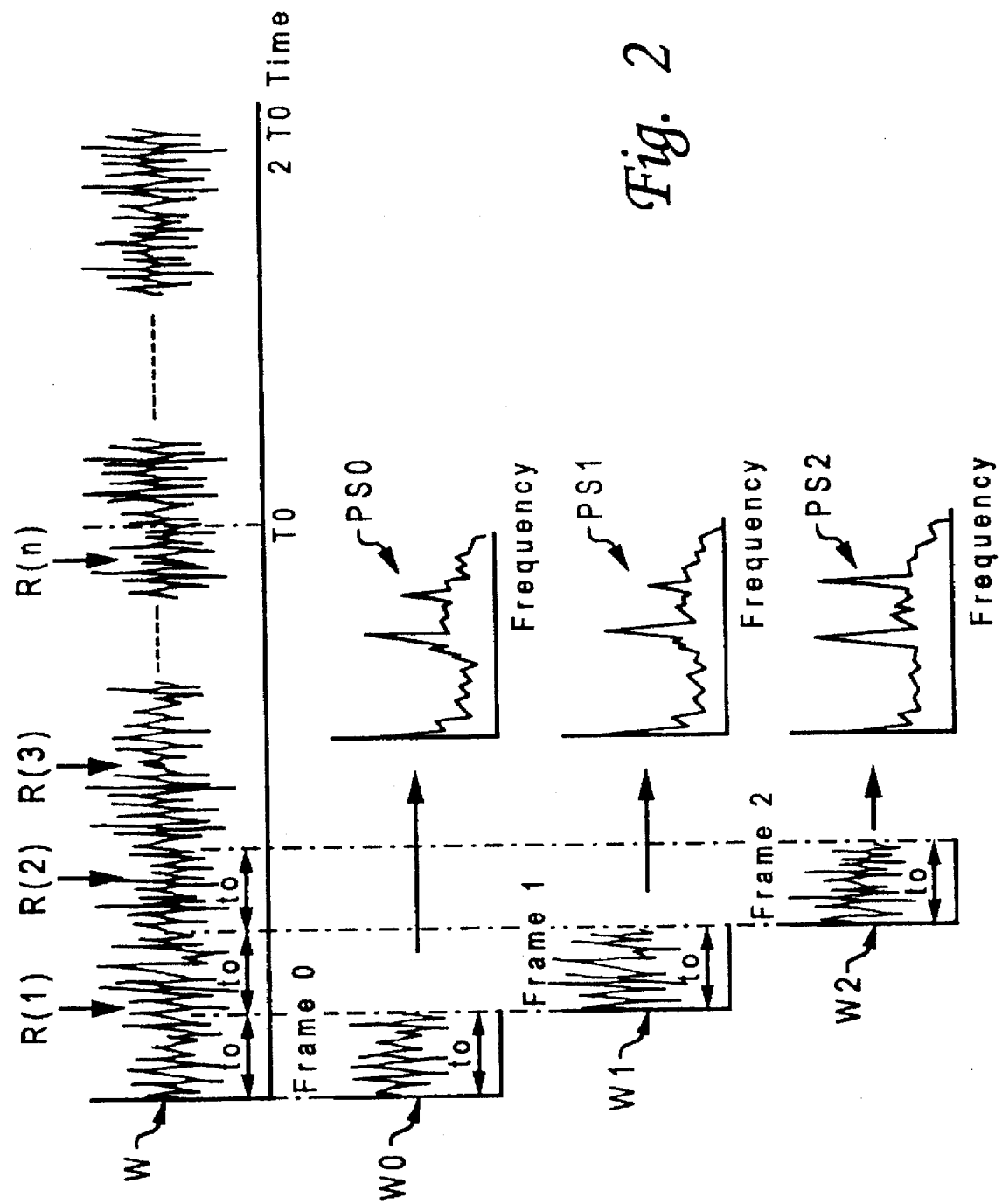
FIG. 2 is a diagram showing A/D-converted digital waveform data, frames, and power spectra.

The A/D converter section of the A/D converter 18 samples the input analog waveform data of the drive sound at predetermined sampling cycles of 2·T0 (in this embodiment, 2 seconds) and converts the sampled data to a digital value. Therefore, the analog waveform data of the drive sound of the HDD 12 is converted to digital waveform data W, as shown in FIG. 2. Converted digital waveform data W is stored in the ring buffer of the memory section of the A/D converter 18.

Digital waveform data W stored in the ring buffer of the A/D converter 18 is output to the frame divider 20, in which digital waveform data W is divided at time intervals of t0 (in this embodiment, 25.6 mS) into frame 0 (digital waveform data W0 between 0 and t0), frame 1 (digital waveform data W1 between t0 and 2·T0), frame 2 (digital waveform data W2 between 2·t0 and 3·t0), . . . , and frame 39 (digital waveform data W39 between 39·t0 and 40·t0). The digital waveform data of the divided frames 0, 1, 2, . . . , and 39 is stored in order in one of the double buffers of the memory section of the frame divider 20. Note that the time interval t0 for dividing digital waveform data W is time corresponding to the resolution of the cycle arithmetic unit 24, and details will be described later.

The frame divider 20 is provided with a double buffer capable of storing two flames. The frame divider 20 periodically reads the digital waveform data of each frame from the ring buffer of the A/D converter 18 and stores it in one of the double buffers. When one (first buffer) of the double buffer becomes full by storing digital waveform data of one frame, the frequency analyzer 22 is informed that one of the double buffers is full.

The frequency analyzer 22 reads digital waveform data of one frame stored in the first buffer and executes a fast Fourier transform (frequency transform) to convert that data to a power spectrum, which is the distribution of energy of the drive sound for each frequency. During this, the frame divider 20 is periodically reading digital waveform data of the next frame output from the A/D converter 18 to the other buffer (second buffer) thereof. Before the second buffer becomes full, the frequency analyzer 22 completes the process of converting the digital waveform data of one frame read from the first buffer to a power spectrum. When the second buffer became full, that fact is reported to the frequency analyzer 22. The frequency analyzer 22 reads the digital waveform data of one frame of the second buffer and converts the data to a power spectrum. The frame divider 20 further stores the digital waveform data of the next frame in the above-described first buffer. In such a processing procedure, the digital waveform data of flames 0 to 39 is converted to power spectra PS0, PS1, PS2, . . . , and PS39, respectively.

Digital waveform data W stored in the ring buffer of the A/D converter 18 is also output to the cycle arithmetic unit 24, which detects the cycle of the drive sound of the HDD 12 based on digital waveform data W. The cycle arithmetic unit 24 considers one frame 256 points and detects the cycle of the drive sound of the HDD 12. For this reason, time interval t0 for dividing digital waveform data W and generating a frame becomes 25.6 mS (=256 ×100 μS). Time interval t0 is also stored in the frame divider 20, which divides digital waveform data W into frames 0 to 39 at time intervals of t0.

Figure 4:
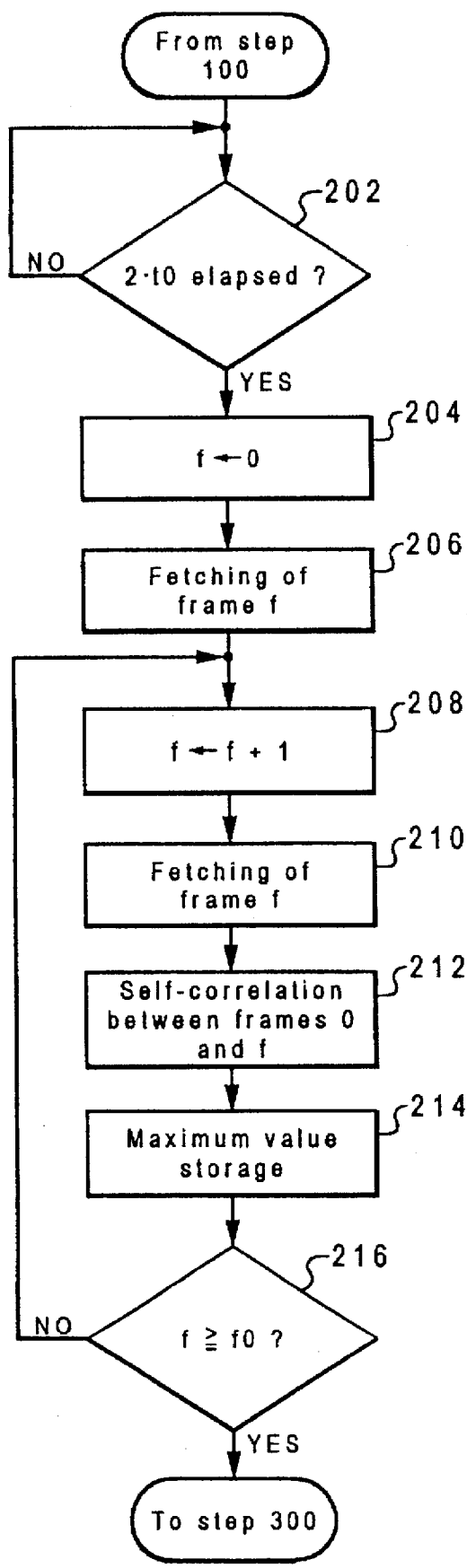
FIG. 4 is a flowchart showing the subroutine of cycle candidate point detection processing.
Figure 3:
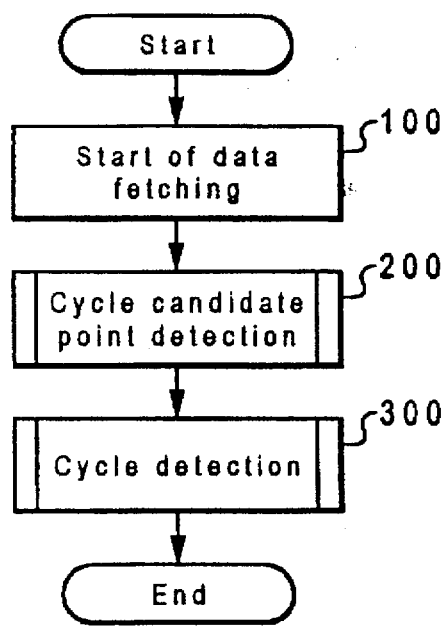
FIG. 3 is a flowchart showing the main routine of cycle detection processing.
Figure 5:
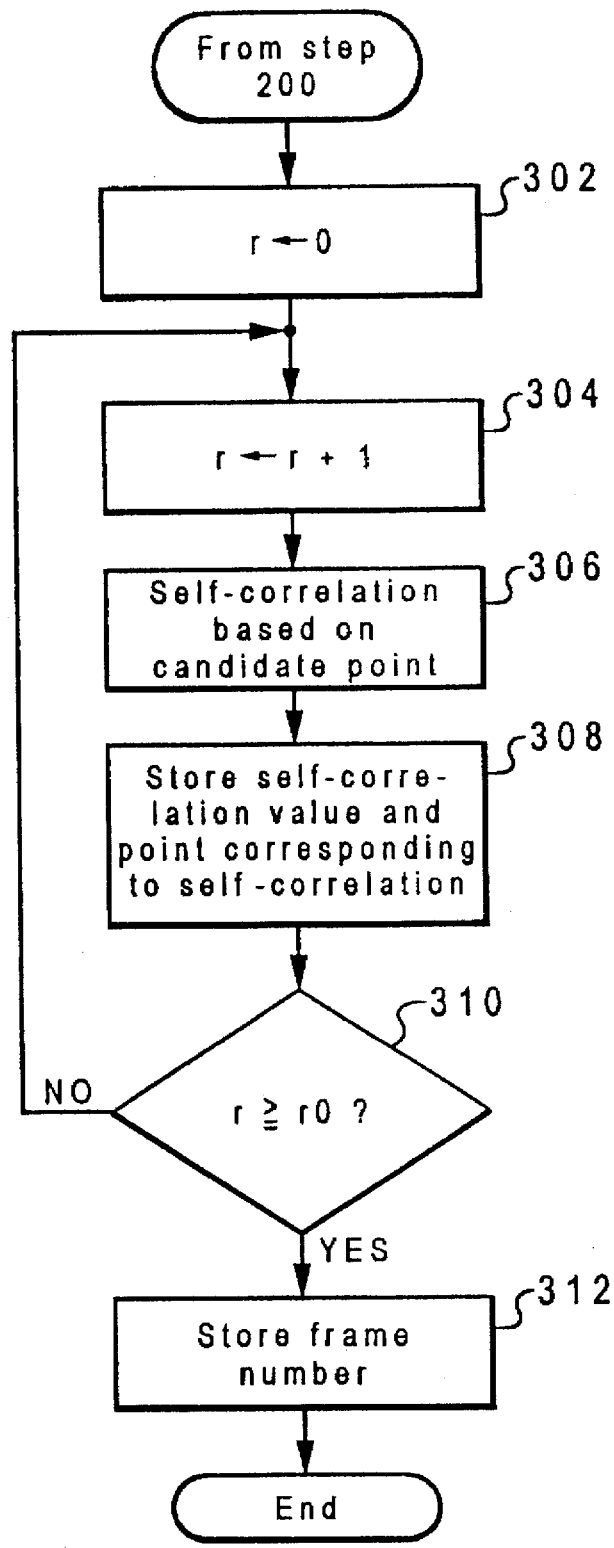
FIG. 5 is a flowchart showing the subroutine of the cycle detection processing.

The processing of the cycle arithmetic unit 24 will be described next with reference to flowcharts shown in FIGS. 3 through 5. First, fetching of digital waveform data W stored in the ring buffer of the A/D converter 18 is started (in step 100 in FIG. 3). In step 200, a cycle candidate point detection process is executed for detecting a plurality of candidate points (in this embodiment, 39 points) for the cycle of the drive sound of the HDD 12 by obtaining a self-correlation which has the leading digital waveform data of the drive sound of frame 0 and the leading digital waveform data of the drive sound of each of frames 1 to 39 as a starting point. In step 300 a cycle detection process is executed for detecting the cycle of the drive sound of the HDD 12 by obtaining a self-correlation which has, as a starting point, the leading digital waveform data of the drive sound of frame 0 and each of the candidate points detected in step 200.

The details of the cycle candidate point detection process in step 200 will be described next with reference to a flowchart (FIG. 4) showing the subroutine for that process. In the cycle arithmetic unit 24, digital waveform data is fetched at cycles of 10 kHz. It therefore takes period of time t0 to fetch all of the digital waveform data for one frame, and it is decided in step 202 whether period of time 2·t0 has elapsed or not. When period of time 2·t0 elapsed, step 202 advances to step 204. If period of time 2·t0 elapses, it will mean that the digital waveform data of the frames 0 and 1 have been fetched by the cycle arithmetic unit 24. In step 204, variable f for identifying a frame is initialized to 0 and, in step 206, the digital waveform data for frame f is fetched. At this time, digital waveform data W0 of the frame 0 has been fetched. In step 208, variable f is incremented by 1 and in step 210 the digital waveform data of frame f is fetched. At this point, digital waveform data W1 of frame 1 has been fetched.

In step 212, self-correlation value $R(\tau)$ between frame 0 and frame f is obtained by the following equation (1):

$$R(\tau) = \frac{1}{256} \sum_{j=0}^{255} x(j) \cdot x(j+\tau+256 \times f) \quad (1)$$

where x(j) represents a value of one point of digital waveform data W0 of frame 0 and x(j+τ+256×f) represents a value of the (j+τ)th point of frame f (across the frame (f+1) in the case of j +τ≧256).

Each self-correlation value $R(\tau)$ is obtained by varying τ from 0 to 255. It is to be noted that, in above-described step 100 (FIG. 3), the digital waveform data stored in the ring buffer of the A/D converter 18 has been fetched and, when self-correlation value $R(\tau)$ between frame 0 and frame f was obtained, fetching of the digital waveform data of the next frame has been completed.

In step 214 a point corresponding to the maximum value among 256 self-correlation values $R(\tau)$ is stored. That point corresponding to the maximum value is a point whose possibility of repeating the digital waveform data of frame 0 is high, and corresponds to a candidate point for the cycle of the drive sound of the HDD 12.

In step 216, it is determined whether variable f is more than the total number of frames f0 or not. It is to be noted that, since, in this embodiment, digital waveform data W is divided into frames 0 to 39, the total number of frames f0 is 39 frames. If, on the one hand, variable f is not more than total frame number f0, step 216 returns to step 208 and the above-described steps (step 208 to step 216) are repeated, because there are some frames for which the self-correlations with frame 0 has not been obtained. If on the other hand, variable f is more than total frame number f0, self-correlation with frame 0 is obtained for each of the frames other than frame 0 and therefore the cycle candidate point detection process is ended. Thus, self-correlation with frame 0 is obtained for frames other than frame 0 and the candidate points for the cycle of the drive sound of the HDD 12, f0 points, are detected (in this embodiment, 39 points).

Thus, since digital waveform data W sampled and digitized by the A/D converter 18 is divided into a plurality of frames and the self-correlation value between the leading frame (frame 0) and a frame other than that frame is obtained, the candidate points for the cycle of the drive sound of the HDD 12 can be obtained.

The cycle detection process in the step 300 for detecting the cycle of the drive sound of the HDD 12 based the candidate points detected in step 200 will be described next with reference to a flowchart (FIG. 5) showing the subroutine for that process. In step 302, variable r for identifying a plurality of the cycle candidate points (in this embodiment, 39 points) is initialized to 0 and, in step 304, variable r is incremented by 1.

In step 306, a self-correlation value having, as a starting point the leading digital waveform data of digital waveform data W0 of the drive sound of frame 0 and the candidate point identified by variable r is obtained by the following equation (2):

$$R(k) = \frac{1}{N+1} \sum_{j=0}^{N} x(j) \cdot x(j+k) \quad (2)$$

where x(j) represents a value of one point of digital waveform data W0 of frame 0, x(j+k) represents a value of the candidate point identified by variable r, k represents the position in array x of the candidate points identified by variable r, and N is 10000−1.

In step 308, the self-correlation values and the points corresponding to that self-correlation values are stored. In step 310, it is determined whether variable r is more than the total number of cycle candidate points r0 or not. If, on the one hand, variable r is not more than total number r0, step 310 returns to step 304 and the above-described steps (step 304 to step 310) are repeated, because all of the self-correlation values based on the cycle candidate points have not been obtained. If, on the other hand, variable r is more than total number r0, all of the self-correlations based on the cycle candidate points are obtained and, therefore, in step 312, there the frame number of a point corresponding to the maximum value among self-correlation values R(k) of r0 points is stored.

As described above, a value which becomes a candidate for the drive sound of the HDD 12 is obtained by the cycle candidate point detection process, and the cycle of the drive sound of the HDD 12 is obtained by the cycle detection process which is based on the cycle candidate point. That is, the frame number is obtained for a point corresponding to the maximum value among self-correlation values R(k) of r0 points.

Thus, since digital waveform data W sampled and digitized by the A/D converter 18 is divided into a plurality of frames, the self-correlation value between the leading frame (frame 0) and a frame other than that frame is obtained, and the cycle of the drive sound of the HDD 12 is obtained by the cycle detection process which is based on the cycle candidate point, the cycle can be obtained without obtaining a self-correlation for all of digital waveform data W, so an amount of calculation can be considerably reduced and the processing time can also be considerably shortened.

The one-cycle power spectrum output unit 26 receives the power spectra (PS0, PS1, PS2, . . . ) from the frequency analyzer 22 together with the cycle information of the HDD 12 (the above-described frame number of the point corresponding to the maximum value among the maximum values) from the cycle arithmetic unit 24. The one-cycle power spectrum output unit 26 then outputs power spectra PS0, PS1, PS2, . . . , and PS39 of one cycle of the HDD 12, based on the cycle information.

Figure 6:
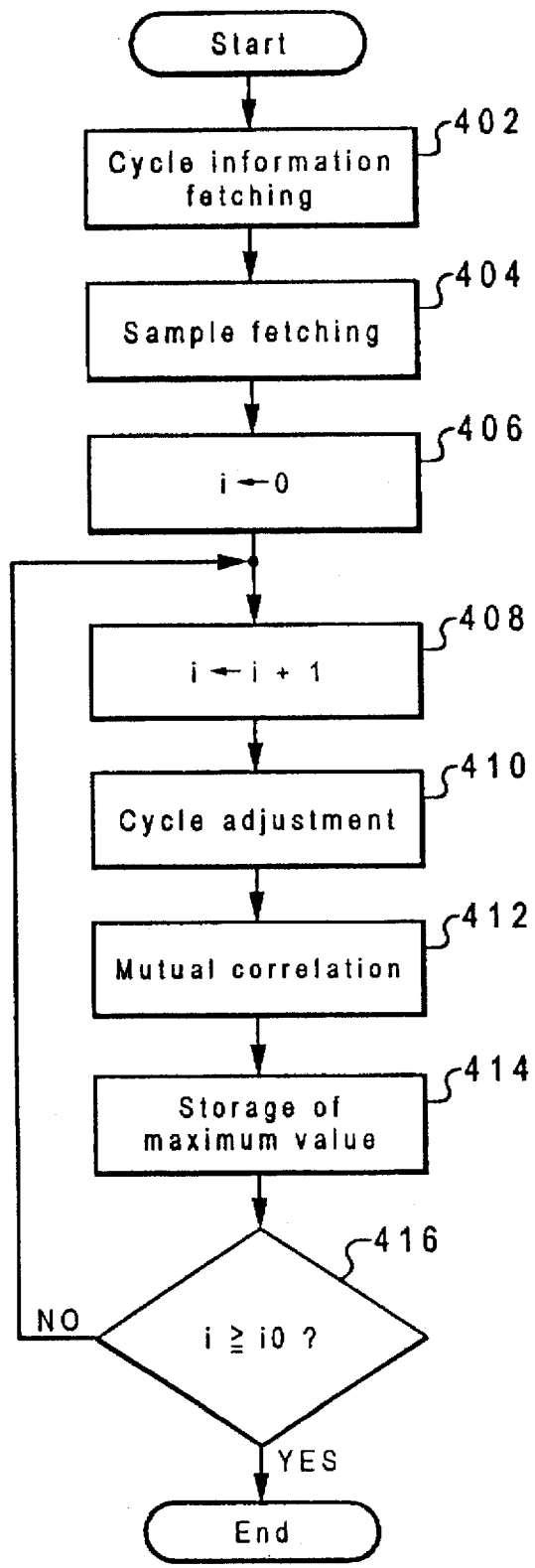
FIG. 6 is a flowchart showing the processing routine for computing a mutual correlation value of a sample to the power spectrum of one cycle of the drive sound of a hard disk drive.

The processing of the sample comparator 28 will be described next with reference to a flowchart shown in FIG. 6. First, in step 402, the cycle information is fetched from power spectra PS0, PS1, PS2, . . . , and PS39 of one cycle input by the one-cycle power spectrum output unit 26. In step 404, based on the fetched cycle information, a sample having a cycle substantially equal to that cycle is fetched from the samples stored in the storage device 300.

Figure 7:
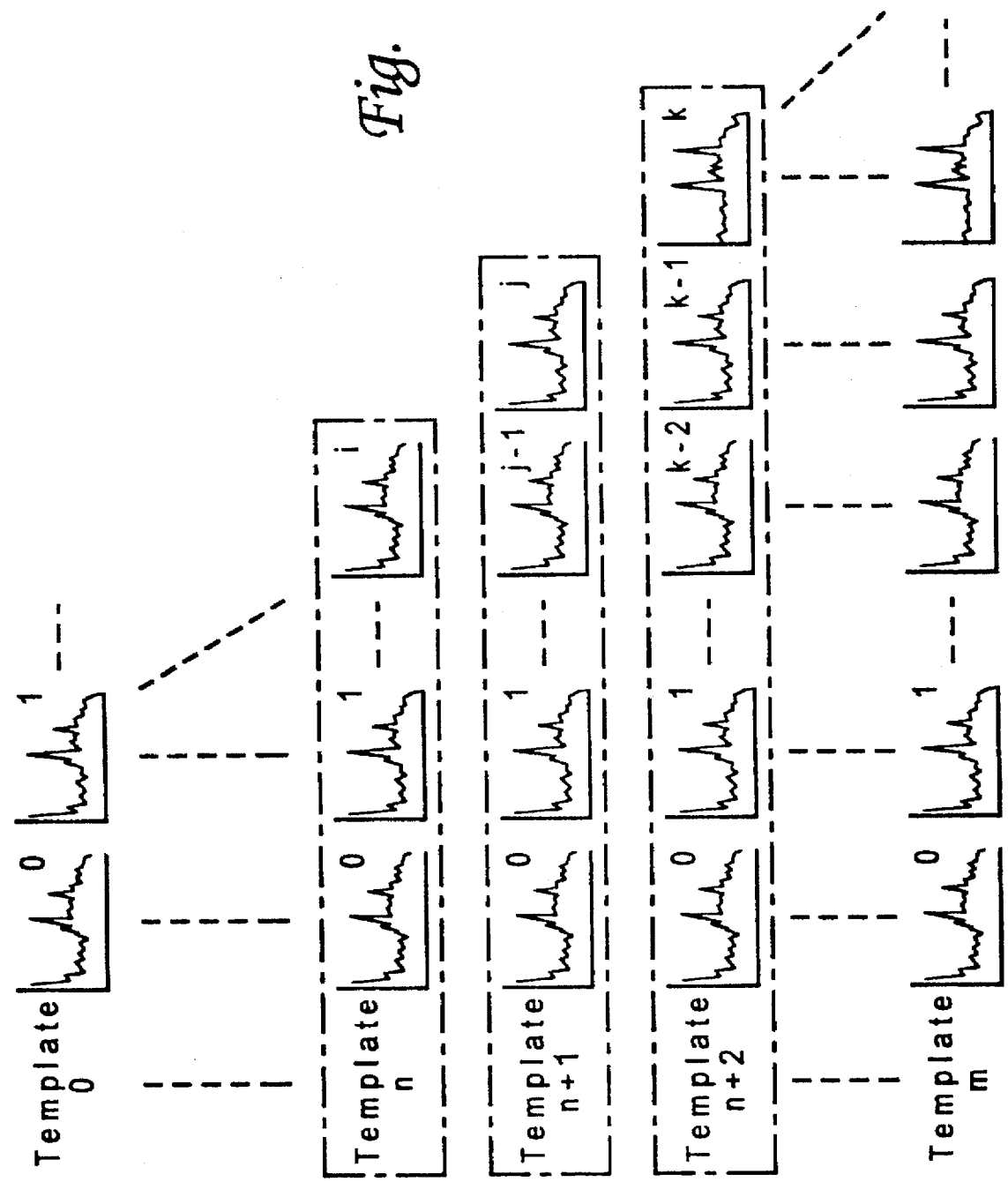
FIG. 7 is a diagram showing the details of the sample.

As shown in FIG. 7, power spectrum samples (templates 0 to m) of a frame of one cycle of a drive sound have been stored in advance in the storage device 30 according to the types of hard disk drive. More particularly, template 0 is power spectrum sample 0 of one frame of a drive sound comprising frames 0 and 1 and having a cycle of 2·t0, template n is a sample n comprising frames 0 to i and having a cycle of i·t0, template n+1 is a sample n+1 comprising frames 0 to j and having a cycle of j·t0 (=(i+1)·t0), template n+2 is a sample n +2 comprising frames 0 to k and having a cycle of k·t0 (=(j+1)·t0). Thus, hard disk drives are classified into various types according to the tone (frequency) of the drive sound, and there is a correlation between this sound and the state (product having good quality, product having bad quality, or a type of defect) of a hard disk drive. Moreover, some samples have the same cycle length. Therefore, in this embodiment, the power spectrum samples (templates 0 to m) of a frame of one cycle of a drive sound have been stored in advance in the storage unit 30 according to the types of hard disk drive which will be classified into various types according to the tone and the cycle of the drive sound.

The reason that a sample having a length substantially equal to the cycle of the drive sound of the HDD 12 is fetched from the storage device 30 is that, although, as will be described later, the sample comparator 28 calculates the mutual correlation values between power spectra PS0, PS1, PS2, . . . , and PS39 of one cycle input from the one-cycle power spectrum output unit 26 and a sample, processing time will become longer if the mutual correction values with all of the samples are obtained, and the cycles of the drive sounds of the hard disk drives are substantially the same for every type of hard disk drive.

If it is now assumed that the length of one cycle of the drive sound of the HDD 12 is j·t0, the sample comparator 28 fetches a sample whose length of one cycle j·t0 is decreased by a period of one frame t0 and a sample whose length of one cycle j·t0 is increased by a period of one frame t0, in addition to a sample whose length of one cycle is j·t0. That is, sample n, sample n+1, and sample n+2 are fetched. The reason that the sample whose length of one cycle is shorter than that of the drive sound of the HDD 12 by a period of one frame t0 and the sample whose length of one cycle is longer than that of the drive sound of the HDD 12 by a period of one frame t0 are thus fetched is that it has been found from a plurality of experimental data that the cycle of a defective hard disk drive has an error of a period of one frame t0 shifted from its original cycle and such a defective hard disk drive can be dealt with. It is to be noted that, while, in this embodiment, it is assumed that, based on the environments under which the test system for the hard disk drive was carried out and on the data of the experiments performed in the same status as that of the hard disk drive at that time, there is an error of a period of one frame t0 shifted from its original cycle, the error also change depending on environments and the status of the hard disk drive at that time. Therefore, concretely, how many error frames there are before and after its original cycle is determined based on the environments under which the test system for the hard disk drive is carried out and on the data of the experiments performed in the same state as that of the hard disk drive at that time.

In step 406, variable i for identifying samples is initialized to 0 and, in step 408, variable i is incremented by 1. In step 410, a cycle is adjusted. This is because a case may occur in which the sample fetched from the storage device 30 is a sample whose length of one cycle is shorter or longer than that of the drive sound of the HDD 12 by a period of one frame t0, as described above.

When the cycle of the ith sample is shorter than the length of one cycle of the drive sound of the HDD 12 by a period of one frame t0, the adjustment of the cycle is made by erasing the end frame of the drive sound of the HDD 12. Also, when the cycle of the ith sample is longer than the length of one cycle of the drive sound of the HDD 12 by a period of one frame t0, the adjustment of the cycle is made by erasing the end frame of the drive sound of the ith sample. It is to be noted that, when the cycle of the ith sample is equal to the length of one cycle of the drive sound of the HDD 12, the adjustment of erasing a frame becomes unnecessary.

In step 412, a mutual correlation value between the ith sample and the power spectrum of one cycle of the drive sound of the HDD 12 is obtained based on the following equation (3):

$$Ri(\tau) = \frac{1}{H+F} \sum_{f=0}^{F-1} \sum_{h=0}^{H-1} x(f,h) \cdot yi(f+\tau, h) \quad (3)$$

where x(f, h) represents the power spectrum of one cycle of the drive sound of the HDD 12, yi(f+τ, h) represents the power spectrum of the ith sample, f is a variable for identifying frames, h is a variable for identifying frequency components, F is the number of frames, H is the number of frequency components, and τ is a variable representative of a lag and changes from 1 to F−1. Also, the power spectrum of the ith sample yi(f+τ, h) is considered to be repeated periodically and is calculated. That is, if equation (3) using data, like yi(F, h)=yi(0, h), yi(F+1, h)=yi(1, h), and yi(F+2, h)=yi(2, h), is calculated, the result will be F mutual correlations RI(τ). In step 414, the maximum value of the mutual correlation value of the ith sample is stored. The value represents the degree of similarity between the drive sound of the HDD 12 and the drive sound of the ith sample.

In step 416, it is determined whether variable i is more than the total number of fetched samples i0 or not. If, on the one hand, variable i is not more than the total number i0, step 416 returns to step 408 and the above-described steps (step 408 to step 416) are repeated, because all of the mutual correlation values of the power spectrum of one cycle of the drive sound of the HDD 12 to of all the samples have not been obtained. If, on the other hand, variable i is more than total number i0, this process is terminated because all of the mutual correlation values of the power spectrum of one cycle of the drive sound of the HDD 12 to all the fetched samples have been obtained.

The decision device 32 detects the maximum value of the maximum values of the mutual correlation values of the power spectrum of one cycle of the drive sound of the HDD 12 to all the fetched samples which have been obtained in the sample comparator 28, and classifies the HDD 12 based on the detected maximum value of the maximum values. That is, the HDD 12 is classified by specifying the type of HDD 12 to be tested for the type of sample that can be specified by the detected maximum value of the maximum values.

As described above, by obtaining the mutual correlation values of the power spectrum of one cycle of the drive sound of the HDD 12 to the samples, hard disk drives can be classified, hard disk drives whose drive sound is low as a noise level but produce a resonance within the drive can be classified, and selecting only hard disk drives having a predetermined tone becomes possible.

While, in the above-described embodiment, the maximum value of the mutual correlations of the power spectrum of one cycle of the drive sound of the HDD 12 to the samples has been obtained, the present invention is not limited to this. For example, when a residual difference corresponding to the frequency of the power spectrum of one cycle of the drive sound of a hard disk drive to a sample is obtained, the obtained residual difference is added, and a value of the residual differences added successively is increased abruptly, that sample is removed, and other samples are likewise added. A sample whose addition value of the residual differences becomes minimum is specified by a residual sequence detection method. The hard disk drive may be classified according to the type of specified sample.

Also, as another method, there is a technique for performing a distance calculation of the power spectrum of the HDD 12 and the power spectrum of a sample. More particularly, as shown in equations (4) and (5), the power spectrum of a certain frame of the HDD 12 and the power spectrum of a certain frame of a sample are considered as vector Eu (X(f), Y(f+τ)), and Euclidean distance Di(τ) therebetween is obtained. If this process is performed for one cycle and the result of the sum is obtained, the result of the distance calculation of the most similar sample will become minimum. It is to be noted that, in this case, it is necessary to repeat the calculation by shifting a frame, in view of the difference in phase. A sample whose Li is minimum among them is selected and a hard disk drive may be classified according to the type of sample.

$$Di(\tau) = \sum_{f=0}^{F-1} Eu(X(f), Y(f+\tau)) \quad (4)$$

$$Li = Min(Di(\tau): \tau = 0 \text{ to } F - 1) \quad (5)$$

Also, while, in the above-described embodiment, the frame divider has generated a digital waveform data group of a plurality of frames by dividing digital waveform data at time intervals of 25.6 mS, the present invention is not limited to this. For example, the cycle arithmetic unit may sample the digital waveform data at finer intervals to obtain the cycle of the drive sound. The time interval that the frame divider divides digital waveform data also becomes longer correspondingly. It is to be noted that if, in this case, the number of digital waveform data items converted and obtained by the A/D converter is considered the same, the number of frames by the frame divider will be reduced. Therefore, the number of digital waveform data items converted and obtained by the A/D converter may be increased. Also, in order to improve the frequency resolution of the frequency analyzer, the time of one frame becomes longer. In this case, the frequency resolution of the cycle arithmetic unit will be deteriorated. It is to be noted that there are also converse cases. The length of the frame is therefore determined in view of this balance.

A second embodiment of the present invention will hereafter be described with reference to the drawings. A rotational-device test system of this embodiment detects whether a dull sound exists in the drive sound of a rotational device such as a hard disk drive. Since many of the parts of this test system for a hard disk drive are identical to corresponding parts of the first embodiment of FIG. 1, the same reference characters will be applied to the corresponding parts and a description only of differing parts will be given.

Figure 8:
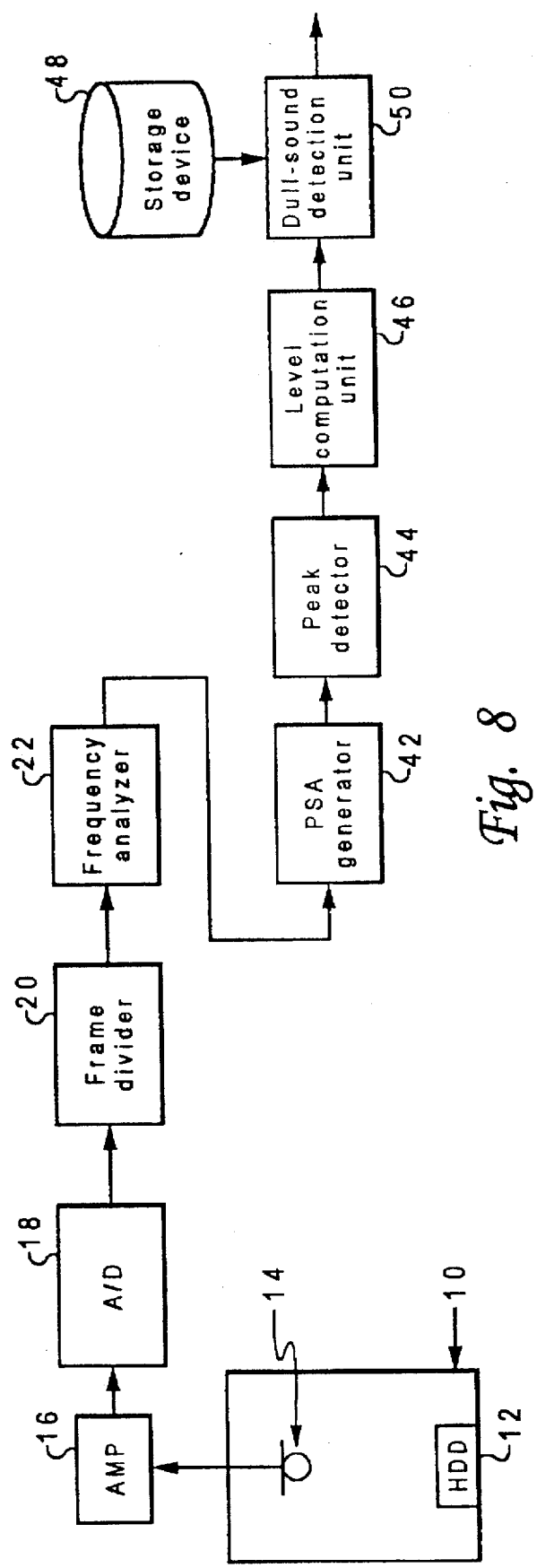
FIG. 8 is a block diagram showing a second embodiment of the present invention.

As shown in FIG. 8, a frequency analyzer 22 is connected to an average power spectrum generator 42. The average power spectrum generator 42 is connected to a peak detector 44. The peak detector 44 is connected to a level computation unit 46. The level computation unit 46 is connected to a dull-sound detection unit 50. The dull-sound detection trait 50 is connected to a storage device 48.

The operation of this embodiment will be described next. As described above, an HDD 12 is driven within a soundproof box 10 by which outside sounds are excluded, and a microphone 14 detects the analog waveform data of the amplitude of a drive sound produced by the HDD 12 and outputs it to an amplifier 16. The amplifier 16 amplifies the input analog waveform data of the drive sound and outputs the amplified data to a A/D converter 18.

Figure 9:
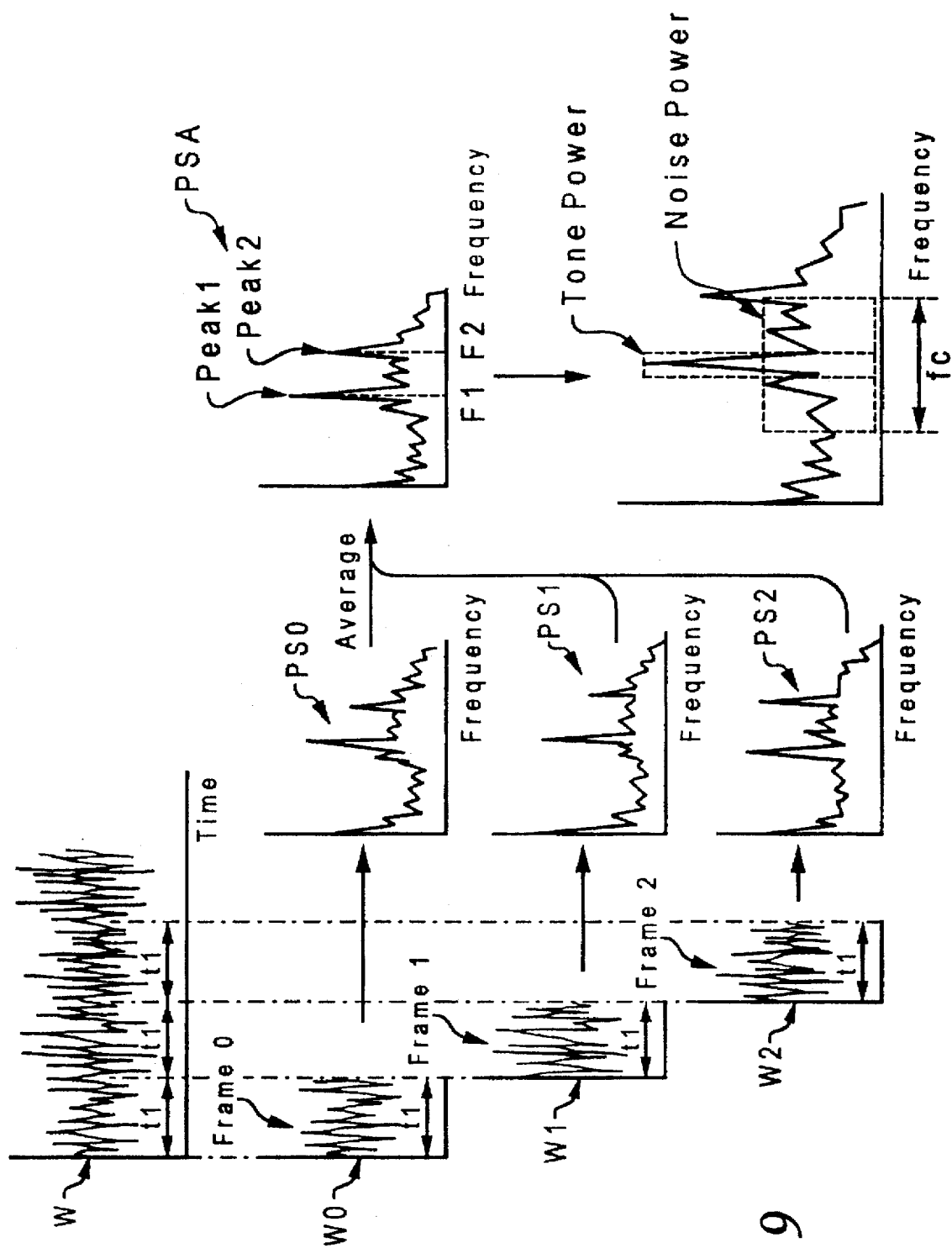
FIG. 9 is a diagram showing the data of each component part of the second embodiment.

The A/D converter section of the A/D converter 18 samples the input analog waveform data of the drive sound at predetermined sampling cycles of T1 (in this embodiment, 15 seconds) and converts the sampled data to a digital value. Therefore, the analog waveform data of the drive sound of the HDD 12 is converted to digital waveform data W, as shown in FIG. 9. Converted digital waveform data W is stored in the ring buffer of the memory section of the A/D converter 18.

Digital waveform data W stored in the ring buffer of the A/D converter 18 is output to a frame divider 20, in which digital waveform data W is divided at time intervals of t1 (in this embodiment, 1 second) into frame 0, frame 1, frame 2, ..., and frame 14. Divided frames 0, 1, 2, ..., and 14 are stored in the double buffer of the memory section of the frame divider 20.

As described above, each of frames 0 to 14 stored in the double buffer of the frame divider 20 is output to the frequency analyzer 22. The frequency analyzer 22 executes a fast Fourier transform to convert input frames 0 to 14 to power spectra PS0, PS1, PS2, ..., and PS14, which are the intensity of the drive sound for each frequency. The average power spectrum generator 42 calculates average power spectrum PSA by averaging power spectra PS0, PS1, PS2, ..., and PS14 for each frequency.

Figure 10:
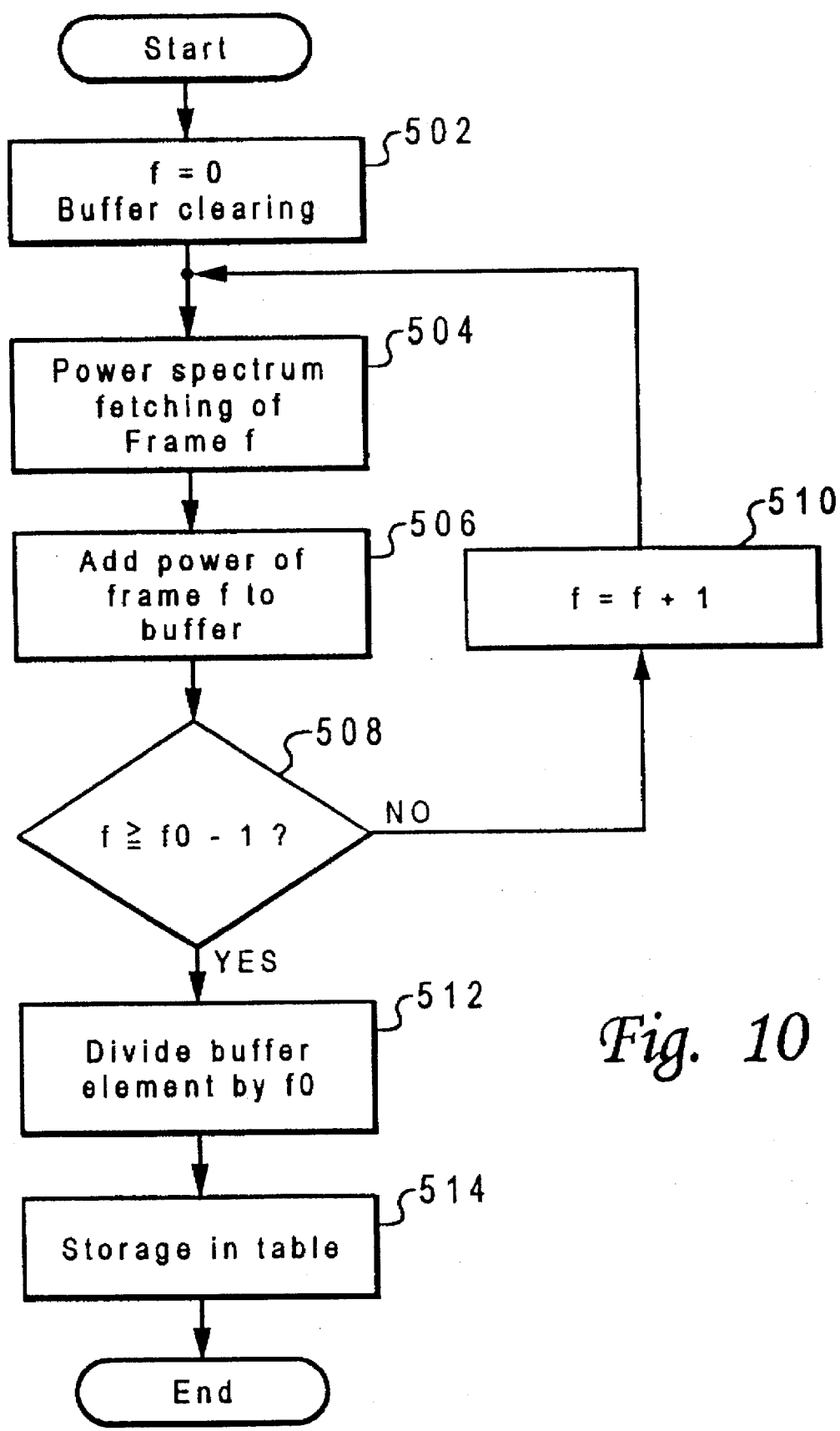
FIG. 10 is a flowchart showing the computation processing routine for computing an average power spectrum.

This processing will be described with reference to the flowchart shown in FIG. 10. First, in step 502, variable f for identifying a frame is initialized to 0 and, at the same time, a working buffer is initialized. In step 504, the power spectrum of frame f is fetched.

In step 506, the power spectrum of frame f is added to the working buffer for each frequency component. In step 508, it is determined whether variable f is more than the total power spectrum number f0-1 (in this embodiment, 15-1) or not. If, on the one hand, variable f is not more than total power spectrum number f0-1, in step 510, variable f is incremented by 1, step 510 returns to step 504, and the above-described steps (step 504 to step 510) are repeated. If, on the other hand, variable f is more than total power spectrum number f0-1, in step 512 an average value is obtained for each frequency component by dividing the element of the buffer by f0 and an average power spectrum PSA is calculated. In step 514, average power spectrum PSA is stored in a table. In this way, this process is terminated. Therefore, average power spectra PSA of frames 0 to 14 are to be stored.

The peak detector 44 detects a frequency having a peak from average power spectra PSA obtained by the average power spectrum generator 42. This processing will be described with reference to the flowchart shown in FIG. 11.

First, in step 602, average power spectrum PSA is fetched and, in step 604, a frequency having a peak is detected from average power spectrum PSA by a convolutional operation. More particularly, the average power spectrum PSA is smoothed by approximating it from the low-frequency side of the average power spectrum every several points with more than a second order function (in this embodiment, second order function), and, at the same time, the differential coefficient of the second order function. There is obtained a point at which the obtained differential coefficient changes from a positive value to a negative value. This point at which the differential coefficient changes from a positive value to a negative value becomes a frequency having a peak and corresponds to a dull sound. For this reason, in the example shown in FIG. 9, a peak 1 and a peak 2 have been detected.

In step 606, average power spectrum PSA and the peak frequency are stored in a table in which they are correlated with each other. For this reason, in the example shown in FIG. 9, average power spectrum PSA and frequency f1 at the peak 1 and frequency f2 at the peak 2 are stored.

In the level computation unit 46, there is computed the level of a masking effect by white noise for detecting whether the sound (dull sound) of the peak frequency is heard by a user without being covered by surrounding noise. That is, as is well known, a dull sound is masked and becomes inaudible, when tone power to be described and noise power existing in a critical band region are equal to each other or the noise power is greater.

This processing will be described with reference to a flowchart shown in FIG. 12. First, in step 702 average power spectrum PSA and the peak frequencies are fetched. In step 704, variable p for identifying peak frequencies is initialized to 0, and, in step 706, variable p is incremented by 1. In step 708, the level of the masking effect is calculated. More particularly, based on the peak frequency (hereinafter referred to as a tone frequency) identified by variable p, the power of the drive sound (hereinafter referred to as tone power (TP)) contained in a narrow band region containing the tone frequency at its center is calculated as shown in FIG. 9. At this point, the tone that is identified by variable p is frequency f1, and TP is calculated. This calculation is extended from the tone frequency (frequency f1) to the low frequency side and the high frequency side along the waveform of the power spectrum as long as the power is reduced. When projections are in the waveform at a position very near the tone frequency (e.g., the range before and after 10 Hz of the tone frequency), it is necessary to pass through the projections to ignore unnecessary projections and to extend the width of the calculation. The minimum value of the width of the tone power is therefore determined so that the width of the calculation does not become less than the minimum value. Also, in this embodiment, the maximum value of the width of the tone power is determined so that the width of the calculation does not become more than the maximum value. More particularly, in this embodiment, the minimum value of the width of the tone power is set, for example, to 3% of a critical band region width, to be described later, and the maximum value of the width of the tone power is set, for example, to 15% of the critical band region width.

The critical band region width having the tone frequency at its center is calculated next, and the power of the sound in that range (hereinafter referred to as NP (noise power)) is calculated. It is to be noted that NP is calculated without adding the power of the tone frequency and on the assumption that there is an average of sounds other than the tone frequency existing in the critical band region. If it is assumed that the tone frequency is f Hz, critical band region width fc can be obtained by known equation (6):

$$fc = 25.0 + 75.0 \cdot [1.0 + 1.4 \cdot (f/1000)^2]^{0.69} \qquad (6)$$

In step 710, average power spectra, peak frequencies, TPs, and NPs are stored in corresponding tables. In step 712, it is determined whether variable p is more than the total number of peak frequencies p0 in the average power spectrum or not. If, on the one hand, variable p is not more than total number p0, step 712 returns to step 706 and the above-described steps (step 706 to step 712) are repeated, because TP and NP have not been calculated for all of the peak frequencies in the average power spectrum. If, on the other hand, variable p is more than total number p0, the present processing is terminated because TP and NP have been calculated for all of the peak frequencies in the average power spectrum.

Therefore, TP and NP are stored in a table according to the average power spectrum and the peak frequency.

Figure 13:
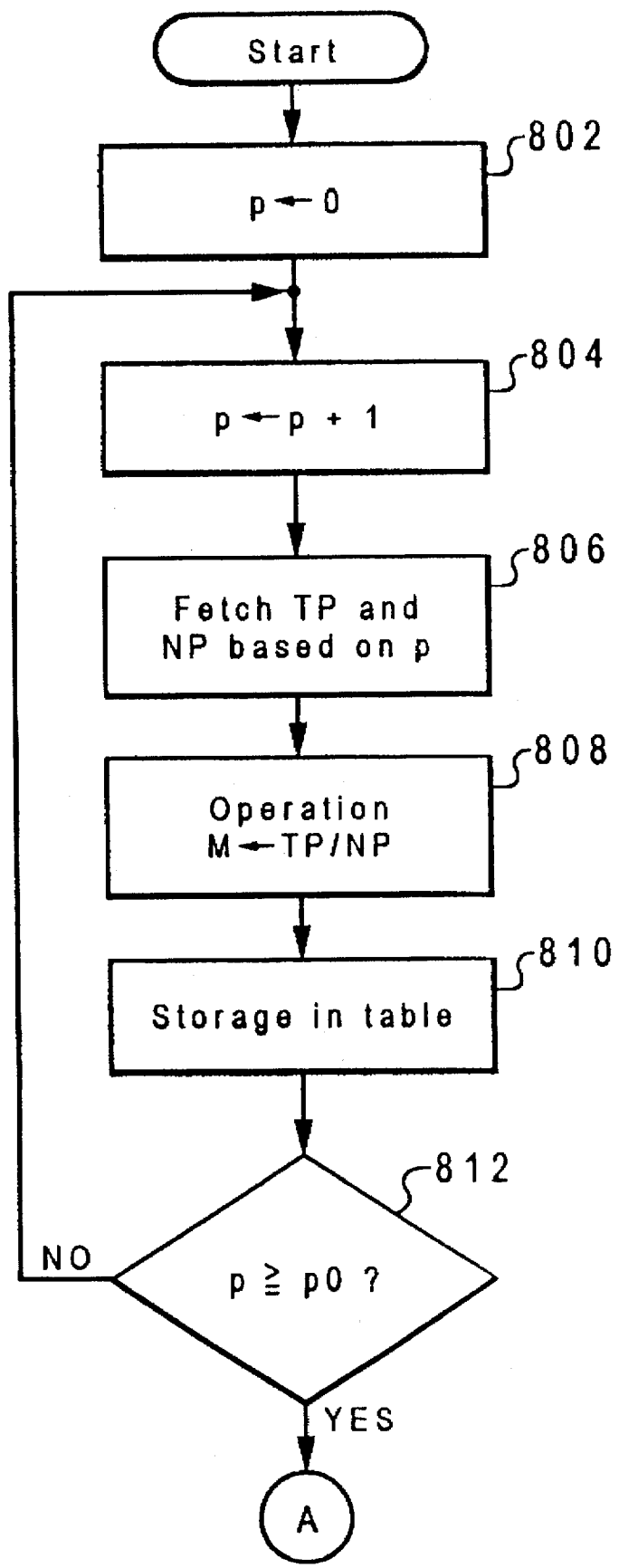
FIG. 13 is a flowchart showing a part of the processing routine for obtaining a ratio between tone power and noise power.
Figure 14:
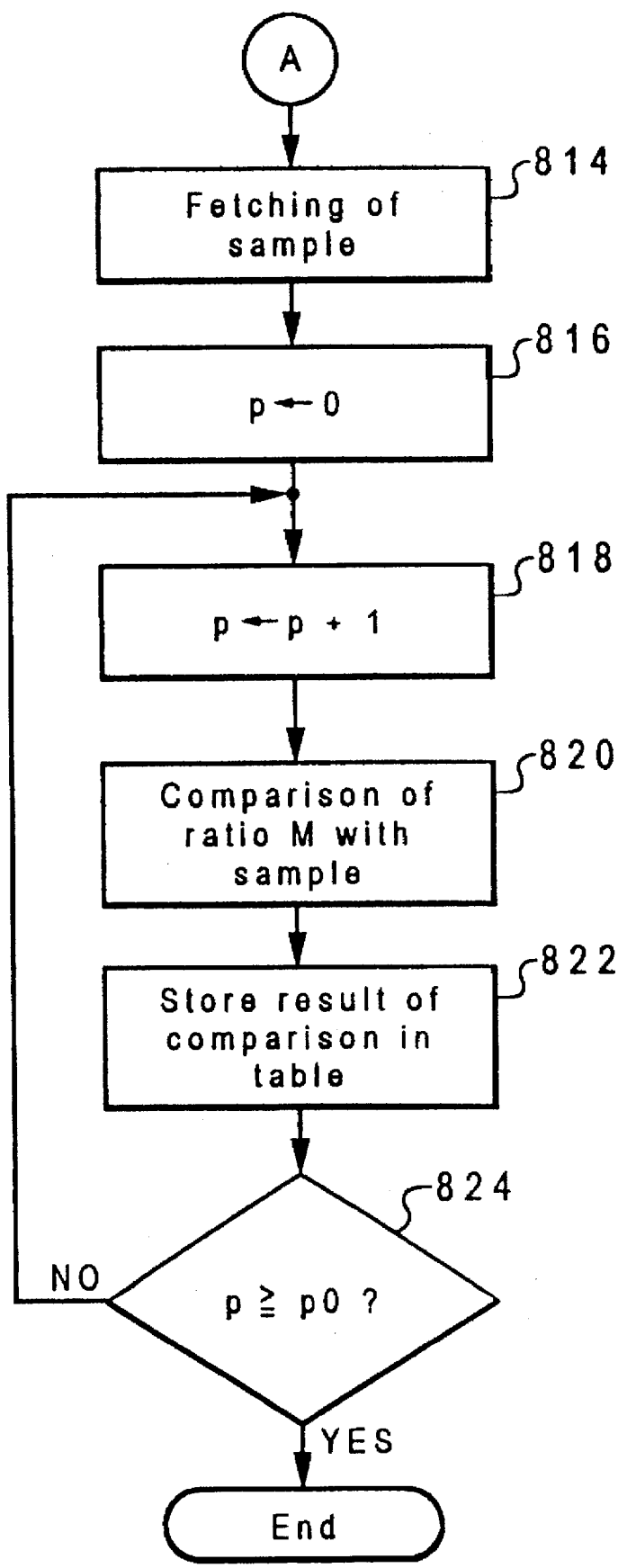
FIG. 14 is a flowchart showing the remaining part of the processing routine for obtaining a ratio between tone power and noise power.

The dull-sound detection unit 50 performs dull-sound detection processing. This processing will be described with reference to flowcharts shown in FIGS. 13 and 14.

First, in step 802, variable p for identifying peak frequencies is initialized to 0, and, in step 804, variable p is incremented by 1.

In step 806, TP and NP are fetched based on the variable p. More particularly, TP and NP in the peak frequency identified by variable p in the average power spectrum are fetched. In step 808, ratio M of TP to NP (=TP/NP) is obtained and in step 810, variable p and ratio M are stored in a table in which they are correlated with each other.

If, on the one hand, in step 812, variable p is not more than the total number of peak frequencies p0, step 812 returns to step 804 and the above-described steps (step 804 to step 812) are repeated because ratio M has not been calculated for all of the peak frequencies in the average power spectrum. If, on the other hand, variable p is more than the total number of peak frequencies p0, step 812 advances to step 814 (FIG. 14) because ratio M has been calculated for all of the peak frequencies in the average power spectrum.

At this point, samples of ratios of TP to NP in all of the dull sounds which will make users feel uncomfortable have been stored in the storage device 48. Therefore, in step 814, samples are fetched from the storage device 48.

Since ratio M has been stored according to variable p for identifying a peak frequency, in step 816, the variable p is initialized to 0 and, in step 818, the variable p is incremented by 1. In step 820, ratio M in the peak frequency identified by the variable p is compared to a sample and it is detected whether there is ratio M more than the sample. In step 822, the comparison result in step 820 is stored in the table described in step 810. This table is a table which stores ratio M according to variable p and which further has a region in which that comparison result is stored.

In step 824, it is determined whether variable p is more than the total number of peak frequencies p0 (corresponding to the total number of ratios M) or not. If, on the one hand, variable p is not more than the total number of peak frequencies p0, step 824 returns to step 818 and the above-described steps (step 818 to step 824) are repeated, because all of the ratios M have not been compared to the sample. If, on the other hand, variable p is more than the total number of peak frequencies p0, this processing is terminated because all of the ratios M have been compared to the sample.

As has been described hereinbefore, this embodiment is capable of classifying hard disk drives according to all dull sounds, because the detected dull sound has been compared to all of the samples of dull sounds which will make users feel uncomfortable. Therefore, substantial labor becomes unnecessary and HDDs which are produced on a large scale can be classified in a short period of time.

While, in the above-described embodiment, the detected dull sound has been compared to all of the samples of dull sounds which will make users feel uncomfortable, the present invention is not limited to this but it may be limited to a desired dull sound.

While, in the above-described embodiment, the average power spectrum has been obtained by averaging in accordance with the frequencies of 15 power spectra, the present invention is not limited to this. The average power spectrum may be obtained by averaging in accordance with the frequencies of a number of power spectra which is less than or more than 15.

While the above-described first and second embodiments have been described with relation to a hard disk drive, the present invention is not limited to this. For example, the invention is also applicable to a rotational device comprising a rotational unit attached through a bearing to a fixed section, such as a tape guide drum of a video cassette recorder.

As described above, the invention as set forth has the advantage that the rotational device can be classified according to the type of drive sound thereof, since the rotational device can be specified according to the type of drive sound because the frequency of the drive sound is distinctive according to the types of products having good quality, products having bad quality, and defects, the power spectrum is obtained by converting the digital time-series data of the amplitude of the drive sound through frequency conversion, and the rotational device is classified based on the power spectrum, not on the level of the drive sound. The amount of calculation for calculating the cycle of the drive sound can be reduced and processing speed can be enhanced, since the cycle of the drive sound of the rotational device is specified by determining a candidate point which becomes a candidate for the starting point of the cycle of the drive sound, for each frame, and by specifying the starting point of the cycle of the drive sound from a plurality of candidate points. The amount of calculation for calculating the cycle of the drive sound can be reduced, processing speed can be enhanced, and the cycle of the drive sound can be accurately specified, since, by selecting a maximum point whose self-correlation between a leading frame of said plurality of frames and each of frames other than said leading frame is maximum, as the candidate point, and, based on the frame of said candidate point in the detected point whose self-correlation having as a starting point the leading time-series data in said leading frame and said candidate point is maximum and on said leading frame, said cycle of said drive sound is specified.

Further the invention has the advantage that the amount of calculation for calculating the cycle of the drive sound can be reduced and the processing speed for the calculation of the cycle of the drive sound can be shortened, since a maximum point whose self-correlation between a leading frame of said plurality of frames and each of other frames other than said leading frame is maximum is detected and the maximum point whose self-correlation is maximum can be selected as a candidate point. Unnecessary samples can be excluded, since samples having a cycle substantially identical to the cycle of the drive sound of the rotational device are selected. In addition, the invention has the advantage that processing time can be shortened and the rotational device can be classified according to the type of drive sound thereof with a smaller amount of data, since the rotational device is classified by detecting a sample whose mutual correlation between each of the samples and the drive sound spectrum of the rotational device is maximum.

Moreover, since the dull sound is classified according to the tone power and noise power thereof and a predetermined dull sound can be specified, it can be detected whether a predetermined dull sound exists in said drive sound of the rotational device or not, based on the tone power and noise power. Accordingly, whether a predetermined dull sound exists in hard disk devices which are produced on a large scale can be detected in a short period of time, without spending substantial labor.

Since the method of the present invention classifies the drive sound and tests the rotational device by comparing only the previously stored data of the drive sound having a cycle substantially identical with said specified cycle to said converted power spectrum, the invention has the advantage that the rotational device can be classified according to the type of drive sound thereof with a smaller amount of data.

Also, since the cycle of the drive sound of the rotational device is specified by determining a candidate point which becomes a candidate for the starting point of the cycle of the drive sound, for each frame, and, by specifying the starting point of the cycle of the drive sound from a plurality of the candidate points, the inventions have the advantage that the amount of calculation for calculating the cycle of the drive sound can be reduced and processing speed can be enhanced. By selecting a maximum point whose self-correlation between a leading frame of said plurality of frames and each of other frames other than said leading frame is maximum, as a candidate point for determining said one cycle of the drive sound, and, by detecting a point whose self-correlation is maximum, the self-correlation having, as a starting point, the leading time-series data in said leading frame and said candidate point, and based on the frame of said candidate point in the detected point whose self-correlation is maximum and on said leading frame, said cycle of said drive sound is specified. The invention therefore has the advantage that the amount of calculation for calculating the cycle of the drive sound can be reduced, processing speed can be enhanced, and the cycle of the drive sound can be accurately specified. Since the maximum point whose self-correlation is maximum is detected for every combination of said leading frame and each of other frames other than said leading frame, the maximum point whose self-correlation is maximum can be selected as a candidate point for the cycle of the drive sound. The invention therefore has the advantage that the amount of calculation for calculating the cycle of the drive sound can be reduced and the processing time for the calculation of the cycle of the drive sound can be shortened.

Still further, the invention can detect whether a predetermined dull sound exists in the drive sound of the rotational device, based on the power spectrum. Therefore, the invention has the advantage that whether a predetermined dull sound exists in rotational devices that are produced on a large scale can be detected in a short period of time, without spending substantial labor and time. Whether a predetermined dull sound exists in said drive sound of the rotational device is detected based on the tone power and the noise power. The invention therefore has the advantage that whether a predetermined dull sound exists in rotational devices that are produced on a large scale can be detected in a short period of time, without spending substantial labor and time.

Since the peak point is obtained by obtaining a function of more than the second order of a frequency of the drive sound and the energy of the drive sound of said frequency, based on said converted power spectrum, and by obtaining a differential coefficient of the function of more than the second order, the invention has the advantage that the peak point for detecting the tone power can be obtained in a short period of time.

The tone power and the noise power are detected based on the average power spectrum of the covered power spectra of frames, and whether a predetermined dull sound exists in said drive sound of the rotational device is detected based on the detected tone power and noise power. The invention therefore has the advantage that whether a predetermined dull sound exists in rotational devices that are produced on a large scale can be accurately detected in a short period of time, without spending substantial labor and time. The peak point is obtained by obtaining the differential coefficient of a function of more than the second order of a frequency of the drive sound and energy of the drive sound of said frequency, based on the average power spectrum. The invention has the advantage that the peak point for detecting the tone power can be obtained accurately in a short period of time. Since the rotational device is classified by specifying the cycle of said drive sound from said time-series data and comparing time-series data of the specified one cycle to previously stored data of the drive sound having a cycle substantially identical to said specified cycle, the invention has the advantage that the rotational device can be classified with a smaller amount of data.

While the invention has been particularly shown and described with reference to a preferred embodiment, it will be understood by those skilled in the art that various changes in form and detail may be made therein without departing from the spirit and scope of the invention.

What is claimed is:

1. A rotational-device test system comprising:
   a detection means for detecting time-series data on the amplitude of a drive sound of a rotational device;
   a digital conversion means for converting the detected time-series data to digital data;
   a power spectrum conversion means for converting a plurality of frame time-series data, obtained by dividing the converted digital time-series data into a plurality of frames at intervals of a predetermined time, to a plurality of power spectra through frequency conversion;
   a cycle specification means for determining a candidate point, which becomes the candidate for the starting point of a cycle of the drive sound, for each of said frames, and for specifying said cycle of the drive sound by specifying said starting point of the cycle from the candidate points of said plurality of frames; and
   a rotational-device classification means for classifying said rotational device based on the power spectrum of one cycle of the drive sound of said rotational device which is based on the specified cycle and the converted power spectrum.

2. The rotational-device test system as set forth in claim 1, wherein said candidate point is specified by a self-correlation.

3. The rotational-device test system as set forth in claim 1, wherein said starting point of a cycle is specified by a self-correlation.

4. The rotational-device test system as set forth in claim 1, wherein said cycle specification means selects a maximum point whose self-correlation between a leading frame of said plurality of frames and each of the other frames other than said leading frame is maximum, as a candidate point for determining said one cycle of the drive sound, and detects a point whose self-correlation is maximum, the self-correlation having as a starting point the leading time-series data in said leading frame and said candidate point, and based on the frame of said candidate point in the detected point whose self-correlation is maximum and on said leading frame, specifies said cycle of said drive sound.

5. The rotational-device test system as set forth in claim 4, wherein said maximum point is obtained by detecting a point whose self-correlation point is maximum, the self-correlation point having said leading time-series data in said leading frame and leading time-series data in frames other than said leading frame, as a starting point, for every combination of said leading frame and each of the frames other than said leading frame.

6. The rotational-device test system as set forth in claim 1, further comprising a sample storage means for storing, in advance, a sample of the power spectrum of one cycle of the drive sound of each of the rotational devices according to the types of rotational devices, and wherein said rotational-device classification means classifies said rotational device by selecting samples having a cycle substantially equal to said cycle of the drive sound of the rotational device from the samples stored in said sample storage means and by detecting a sample whose mutual correlation between each of said samples and said power spectrum of one cycle of the rotational device is maximum.

7. A rotational-device test system comprising:
   a detection means for detecting the time-series data of an amplitude of a drive sound of a rotational device;
   a digital conversion means for converting the detected time-series data to digital data;
   a power spectrum conversion means for converting a plurality of frame time-series data, obtained by dividing the converted digital time-series data into a plurality of frames at intervals of a predetermined time, to a plurality of power spectra through frequency conversion;
   a power detection means for detecting the tone power which is the power of the drive sound contained in a narrow band region, the narrow band region being based on a frequency corresponding to the peak point of the converted power spectrum and having said frequency corresponding to the peak point at its center, and for detecting noise power which is the power of the drive sound in a critical band region width having the peak frequency at its center; and a dull-sound detection means for detecting whether a predetermined dull sound exists in said drive sound of the rotational device or not, based on the detected tone power and noise power.

8. A rotational-device test method comprising the steps of:

detecting time-series data of an amplitude of a drive sound;

converting the detected time-series data to digital data;

dividing said digital data into a plurality of frames at intervals of a predetermined time and converting a plurality of the divided frame time-series data to a plurality of power spectra through frequency conversion; and testing a rotational device by classifying said drive sound by comparing the converted power spectrum with the data of the drive sound stored in advance in the form of a power spectrum;

wherein a cycle of said drive sound is specified, and only the data of the drive sound stored in advance which has a frequency substantially identical to the specified cycle of said drive sound is an object of said comparison.

9. The rotational-device test method as set forth in claim 8, wherein said cycle of said drive sound is specified by a first step of determining a candidate point which becomes a candidate for a starting point of said cycle of said drive sound, for each frame, and a second step of specifying said starting point of said cycle from a plurality of determined candidate points.

10. The rotational-device test method as set forth in claim 8, wherein said cycle of said drive sound is specified by a self-correlation.

11. The rotational-device test method as set forth in claim 8, by selecting a maximum point whose self-correlation between the leading frame of said plurality of frames and each of the other frames other than said leading frame is maximum, as a candidate point for determining said one cycle of the drive sound, and by detecting a point whose self-correlation is maximum, the self-correlation having as a starting point the leading time-series data in said leading frame and said candidate point, and based on the frame of said candidate point in the detected point whose self-correlation is maximum and on said leading frame, said cycle of said drive sound is specified.

12. The rotational-device test method as set forth in claim 11, wherein said maximum point is obtained by obtaining a self-correlation having said leading time-series data in said leading frame and leading time-series data in a frame other than said leading frame, as a starting point, for every combination of said leading frame and each of the frames other than said leading frame, and by detecting a point whose self-correlation point obtained is maximum, for every said combination.

13. A rotational-device test method comprising the steps of:

detecting time-series data of an amplitude of a drive sound of a rotational device;

converting the detected time-series data to digital data;

dividing said digital data into frames having a specified length of time and converting a plurality of the frame time-series data into a plurality of power spectra through frequency conversion; and detecting whether a predetermined dull sound exists in the drive sound of the rotational device or not, based on the converted power spectra.

14. The rotational-device test method as set forth in claim 13, wherein tone power which is the power of the drive sound contained in a narrow band region, which region is based on a frequency corresponding to the peak point of the converted power spectrum and has said frequency corresponding to the peak point at its center, is detected, noise power which is the power of the drive sound in a critical band region width having the peak frequency at its center is detected, and whether a predetermined dull sound exists in said drive sound of the rotational device is detected based on the detected tone power and noise power.

15. The rotational-device test method as set forth in claim 14, wherein a function of more than the second order of a frequency of the drive sound and the energy of the drive sound of said frequency is obtained based on said converted power spectrum, and said peak point is obtained by obtaining a differential coefficient of the obtained function.

16. The rotational-device test method as set forth in claim 13, wherein an average power spectrum is calculated by averaging said converted plurality of power spectra of said frames for every frequency, said tone power and said noise power are detected based on the frequency corresponding to the peak point of the obtained average power spectrum, and whether a predetermined dull sound exists in said drive sound of the rotational device is detected based on the detected tone power and noise power.

17. The rotational-device test method as set forth in claim 16, wherein a function of more than the second order of the frequency of the drive sound and energy of the drive sound of said frequency is obtained based on said average power spectrum, and said peak point is obtained by obtaining a differential coefficient of the obtained function.

18. A rotational-device test method wherein the time-series data of a drive sound of a rotational body is detected, a cycle of said drive sound is specified from said time-series data, and a rotational device is tested by classifying the rotational device by comparing the time-series data of the specified one cycle with the previously stored data of the drive sound having a cycle substantially identical to said specified cycle.

* * * * *